United States Patent [19]

Borror et al.

[11] 3,926,971

[45] Dec. 16, 1975

[54] NOVEL CHEMICAL SYNTHESIS

[75] Inventors: Alan L. Borror, Lexington; Ruth Linda Hill, Cambridge; Paulina P. Garcia, Arlington, all of Mass.

[73] Assignee: Polaroid Corporation, Cambridge, Mass.

[22] Filed: May 22, 1974

[21] Appl. No.: 472,273

[52] U.S. Cl. .............. 260/240.6; 96/1.7; 260/240.8
[51] Int. Cl.$^2$............... C07D 233/24; C07D 417/06; C07D 421/06
[58] Field of Search ...................... 260/240.6, 240.8

[56] References Cited
UNITED STATES PATENTS
3,264,110   8/1966   Depoorter et al. .............. 260/240.6

OTHER PUBLICATIONS

Knott, J. Chem. Soc. 1946, p. 120–122.

*Primary Examiner*—Arthur P. Demers
*Attorney, Agent, or Firm*—Mart C. Matthews; Philip G. Kiely

[57] ABSTRACT

A method is disclosed for preparing 2-$\beta$-anilinovinyl derivatives of benzimidazolium salts, useful in the preparation of cyanine dyes and related compounds, which comprises condensing a benzimidazolium salt having a reactive methyl group with an alkyl isoformanilide in a glycol ether medium.

9 Claims, No Drawings

NOVEL CHEMICAL SYNTHESIS

BACKGROUND OF THE INVENTION

1. Field of the Invention

This invention relates to chemistry and, more specifically, to the preparation of 2-$\beta$-anilinovinyl derivatives of benzimidazolium salts which are useful in the synthesis of the cyanine dyes and related compounds.

2. Description of the Prior Art

It has long been known that $\beta$-anilinovinyl derivatives of cyclic quaternary salts, useful as intermediate compounds in the synthesis of various cyanine dyes and related compounds possessing photographic sensitizing properties, may be obtained by the condensation of equimolar quantities of a heterocyclic quaternary salt having a reactive methyl group with diphenylformamidine. Another method for forming the 2-$\beta$-anilinovinyl compounds comprised heating together, e.g., at 100° for 30 minutes, equimolar quantities of a heterocyclic quaternary salt having a reactive methyl group, ethyl orthoformate and aniline. Another variation consisted in heating an alkyl toluene-p-sulfonate having a reactive methyl group with diphenylformamidine in the presence of an alkyl ortho-ester. For further background, see Hamer *Cyanine Dyes and Related Compounds*, Interscience Publishers, New York (1964), particularly pages 118–120, and the references noted therein, e.g., British Pat. No. 344,409. The above reactions, however, have not generally been found to be readily adaptable to large-scale commercial operations, for example, because of the partial vacuum and/or high temperatures usually required.

Although it appears that the 2-$\beta$-anilinovinyl derivatives of benzoxazolium, benzothiazolium and naphthothiazolium salts have previously been obtained in acceptably high yields by reaction with alkylisoformanilides in an inert solvent such as an alcohol, such reactions with benzimidazolium salts have not been reported in the literature, possibly because of their relative insolubility in the solvents conventionally employed. See, for example, *J. Chem. Soc.* (1946), pages 120–122; British Pat. No. 334,706 and the aforementioned Hamer reference, pages 130–132.

BRIEF SUMMARY OF THE INVENTION

In accordance with the present invention, a 2-$\beta$-anilinovinyl derivative of a benzimidazolium salt is prepared by condensing the benzimidazolium salt having a reactive methy group with an alkyl isoformanilide, preferably ethyl isoformanilide, in a glycol ether medium, e.g., a 2-methoxyethanol or 2-ethoxyethanol medium. The above condensation reaction is readily adaptable to large-scale synthetic procedures and may be advantageously employed in preparing cyanine dyes and related compounds having at least one heterocyclic nucleus of the benzimidazole series, e.g., unsymmetrical benzimidazolocarbocyanine dyes used for the spectral sensitization of photographic silver halide emulsions.

DETAILED DESCRIPTION OF THE PREFERRED EMBODIMENT

Preferred 2-$\beta$-anilinovinyl compounds prepared according to the present invention may be represented by the formula:

I.

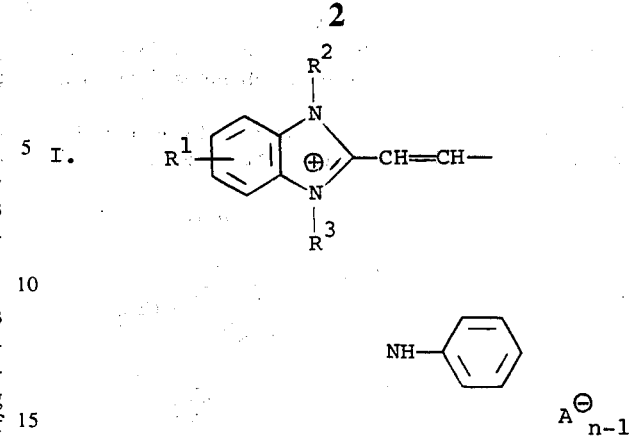

wherein $R^1$ represents hydrogen or one or more nuclear substituents usual in the cyanine dye art, e.g., lower alkyl, lower alkoxy, benzyl, phenyl, naphthyl, halogen, amino, hydroxyl, cyano, lower carboxyalkyl, lower carbalkoxy, lower acrylamido, etc.; $R^2$ is lower alkyl; $R^3$ is lower alkyl, carboxyalkyl or sulfoalkyl; A is an anion customary in the cyanine dye art, e.g., chloride, bromide, iodide, methylsulfate, ethylsulfate, p-toluenesulfonate, benzenesulfonate, acetate, propionate, cyanate, perchlorate, etc.; and $n$ is the integer 1 or 2. When $n=1$ there is no "external anion" as such, but instead the compound exists in an "internal salt" form wherein the anion is the negatively charged form of the sulfoalkyl or carboxyalkyl group represented by $R^3$ and the cation is the positive charge on one of the benzimidazole nitrogens. The internal salt form may also be designated the "betaine," "zwitterion" or "anhydro" form.

It should be noted that the acid hydrogen of the acid groups represented by formulae herein may be readily replaced by an appropriate cation, for example, an alkali metal ion, triethylammonium, etc., and said formulae are intended to encompass these materials. Thus, as previously indicated, $R^3$ may be sulfoalkyl or carboxyalkyl, e.g., those sulfoalkyl or carboxyalkyl groups having from 1 to 4 carbon atoms, inclusive, in the alkylene chain, or corresponding salt forms thereof.

The term "lower" whenever used herein including the claims, denotes a group having a hydrocarbon chain of from 1 to 3 carbon atoms inclusive. Thus, when reference is made to lower alkyl, this term is intended to include methyl, ethyl, and propyl; the term "lower alkoxy" is intended to include methoxy, ethoxy and propoxy; the term "lower carbalkoxy" is intended to include carbmethoxy, carbethoxy and carbpropoxy; and so forth. The term "halogen" is intended to include the substituents -Cl, -Br, -F and -I.

Benzimidazolium salts useful in the present invention may be represented by the formula:

II.

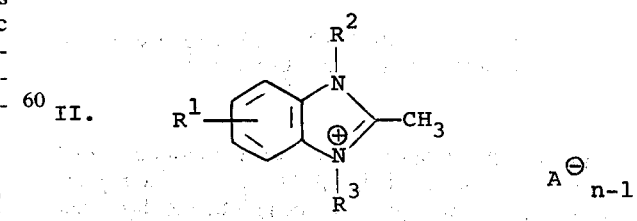

where $R^1$, $R^2$, $R^3$, A and $n$ have the previously given definitions. These compounds may be prepared according to conventional procedures in the art, for example, by quaternizing the appropriate benzimidazole compound with a halo-substituted alkane such as ethyl iodide.

As examples of benzimidazolium salts within the scope of formula II, mention may be made of:

A. 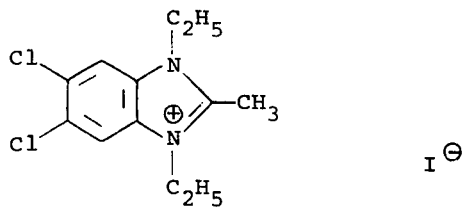 I⁻

B. 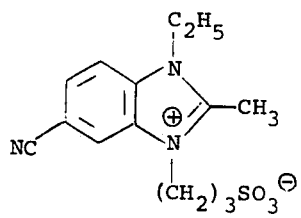

5-cyano-1-ethyl-3-(3'-sulfopropyl)-2-methylbenzimidazolium betaine

C. 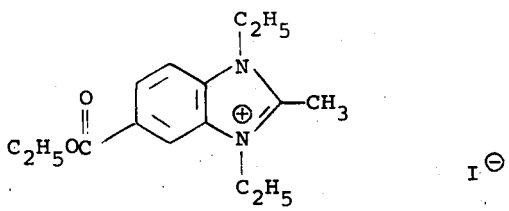 I⁻

5—carbethoxy—1,3-diethyl-2-methylbenzimidazol iodide

D. 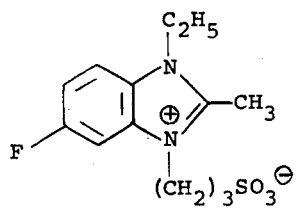

5-fluoro-1-ethyl-3-(3'-sulfopropyl)-2-methylbenzimidazolium betaine

Alkylisoformanilides are known compounds which are commercially available. Particularly advantageous results have been achieved in the practice of this invention with ethyl isoformanilide, i.e.,

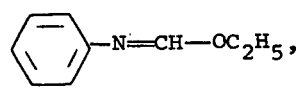

obtained commercially, for example, from Frinton Laboratories, South Vineland, New Jersey.

It has been found that a glycol ether medium, and particularly a 2-methoxyethanol medium, is uniquely suited for the condensation of a benzimidazolium salt with an alkylisoformanilide according to this invention. The aforementioned 2-methoxyethanol may be obtained commercially, for example, under the trademark Methyl Cellosolve. Other solvents previously used for similar condensation reactions, for example, pyridine, acetic anhydride, or lower alcohols, either do not produce the desired 2-β-anilinovinyl product with the benzimidazolium salt in acceptable yields or produce an unacceptably impure product. However, preferred glycol ether solvents, e.g., 2-methoxyethanol, allow the above-described condensation to proceed substantially quantitatively and, since impurities tend to remain soluble in this solvent during the cooling of the reaction mixture, a pure product may be readily isolated with a minimum of further purification steps.

A further understanding of the preparation of the present invention may be gained by a consideration of the following example which is intended to be illustrative only and not limiting of the invention.

EXAMPLE I

The benzimidazolium salt of formula A above, 5,6-dichloro-1,3-diethyl-2-methylbenzimidazolium iodide, was prepared by refluxing with stirring for about 48 hours, a mixture of 5,6-dichloro-1-ethyl-2-methylbenzimidazole with ethyl iodide in methylethyl ketone. After chilling the reaction mixture, the quaternized product was collected, washed with acetone and dried at 60° C. under pressure to yield a white powder having a melting point in excess of about 300° C. Then 100 g. (0.26 moles) of the benzimidazolium salt thus prepared was suspended with 77.5 g. (0.52 moles) of ethyl isoformanilide in 100 ml. of Methyl Cellosolve, and the mixture refluxed for 18 hours to form a red-orange suspension. The reaction mixture was chilled, the solid collected, washed with ethanol and dried at 50° C. in a vacuum dessicator to yield the crude pale orange product. The finely divided powder (yield=91%) was boiled with 10 ml./g. ethanol for about one-half hour, and then collected while hot, washed with ethanol and dried at 50° C. in a vacuum dessicator to provide the pure product (yield=82.5%) represented by the formula:

one heterocyclic nucleus of the benzimidazole series attached to another different heterocyclic nucleus through a trimethine chain, may be conveniently synthesized employing a 2-β-anilinovinyl benzimidazolium compound prepared in accordance with the method of the present invention and conventional procedures in the art. In one preferred synthesis, the anilinovinyl derivative may be first reacted with a strong base such as sodium hydroxide to form the corresponding phenylimino derivative, which in turn may be reacted with a sulfonyl chloride such as p-toluene sulfonyl chloride to form the p-tolusulfoanilinovinyl derivative and the latter compound may then be condensed with the selected heterocyclic quaternary salt having a reactive methyl group, e.g., a 2-methyl substituted benzothiazolium, benzoxazolium, benzoselenazolium, quinolinium, naphthothiazolium, etc., salt in the presence of a base to form the unsymmetrical benzimidazolocarbocyanine dye. The aforementioned base comprises a basic condensing agent such as an organic amine, e.g., tri-n-propylamine, tri-n-butylamine, triisoamylamine, triethylamine, trimethylamine, dimethylaniline, diethylaniline, pyridine, N-alkylpiperidine, etc.; an alkali metal carboxylate in a carboxylic anhydride, e.g., sodium acetate in acetic anhydride; or an alkali metal hydroxide, e.g., sodium hydroxide, potassium hydroxide.

Alternatively, the above-mentioned p-tolusulfoanilido vinyl derivative may be condensed with other compounds, for example, with cyclic ketomethylene compounds to form merocyanines or with benzimidazolium salts to form symmetrical cyanine dyes according to conventional procedures in the art. See for example, the aforementioned Hamer reference, British Pat. Nos. 955,962 and 955,964 and U.S. Pat. No. 3,264,110.

The method of the present invention has been found

E.

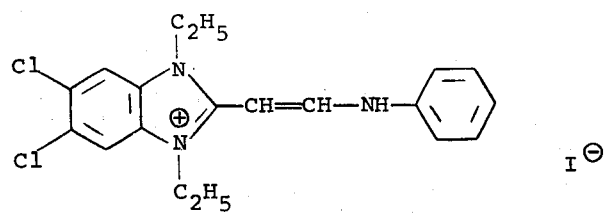

1,3-diethyl-5,6-dichloro-2-anilino-vinylbenzimidazolium iodide

As previously noted, 2-β-anilinovinyl compounds such as represented by formula I have proven to be useful in a variety of synthetic procedures for cyanine materials having at least one heterocyclic nucleus of the benzimidazole series. For example, unsymmetrical benzimidazolocarbocyanine dyes, i.e., those dyes having to be particularly advantageous in the synthesis of unsymmetrical benzimidazolocarbocyanine dyes such as disclosed in the copending applications of Borror et al., Ser. Nos. 430,422 and 430,423, filed Jan. 2, 1974. The above-mentioned dyes may be generically represented by the formula:

III.

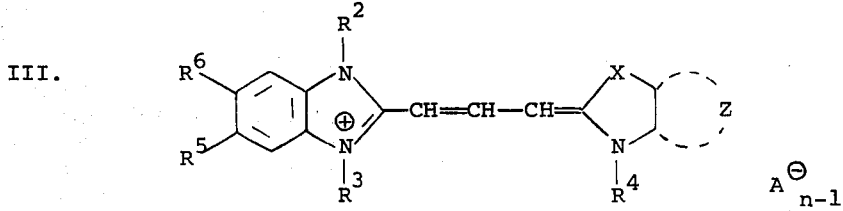

wherein $R^2$, A and $n$ have the same meaning as in formula I; $R^3$ and $R^4$ are the same or different and each represent a carboxyalkyl, sulfoalkyl or lower alkyl group as previously defined for $R^3$ in formula I; $R^5$ is halogen (e.g., chloro, bromo, fluoro or iodo) cyano, or lower carboxyalkyl; $R^6$ is hydrogen or halogen; X is S or Se; and Z represents the atoms necessary to complete a heterocyclic nucleus of the benzothiazole or benzoselenazole series, which may be unsubstituted or include the usual substituents, for example, halogen, lower alkyl, lower carbalkoxy, lower alkoxy, lower acylamido, etc., preferably on the carbon atom occupying the 5-position in the nucleus. Several specific examples of unsymmetrical benzimidazolocarbocyanine dyes within formula III are set forth in the aforementioned applications for patent.

Optimum results are obtained in the condensation reactions comprising the synthesis of the above cyanine dyes if 2-methoxyethanol is employed as the solvent throughout the synthesis. For example, the phenylimino derivative described above may be reacted with p-toluene sulfonyl chloride in a 2-methoxyethanol medium, and then the benzothiazolium or benzoselenazolium salt may be added directly to this reaction mixture to form the desired dye. It was quite unexpected to find that the formation of the p-tolusulfoanilidovinyl derivative and the resultant cyanine dye product could be combined in the same 2-methoxyethanol reaction mixture, mainly because of the expectation that the p-toluene sulfonyl chloride would preferentially react with the 2-methoxyethanol.

In addition to the convenience of 2-methoxyethanol in large-scale commercial operations, the solvent provides a product of higher purity than other solvents previously employed for such condensation reaction. The use of 2-methoxyethanol as the reaction solvent in the condensation reactions forming cyanine dyes is the subject matter of (our Case No. 5056), filed concurrently herewith.

The following example will serve to illustrate the preparation of cyanine dyes employing the present invention; however, it is understood that the invention is not to be limited to the details set forth therein.

EXAMPLE II

The imino derivative of formula F, 1,3-diethyl-2-($\beta$-phenyliminoethylidene)-5,6-dichlorobenzimidazoline, was prepared by adding to an acetone solution of compound F, 2 moles of NaOH per mole of compound F with stirring at room temperature. The resultant solution was stirred for about 1.5 hours, and poured into water to form a yellow precipitate, which was stirred for another 30 minutes, filtered, washed with water and dried at 50° C. under vacuum to constant weight.

100 g (0.278 M) of the orange imino compound thus prepared was suspended in 850 ml. of Methyl Cellosolve in a 2-liter-3-neck round bottom flask equipped with a stirrer, thermometer and reflux condenser. 52.8 g (0.278 M) of finely ground p-toluenesulfonyl chloride was added all at once, forming a solution with a concomittant rise in temperature from 20° to 29°C. The reaction was allowed to proceed for 30 minutes with stirring. 79.2 g (0.278 M) of finely ground 2-methyl-3-(4'-sulfobutyl)benzothiazolium betaine (prepared by quaternizing 2-methylbenzothiazole with 1,4-butane sultone in 3-heptanone in a conventional procedure) was then added, forming a suspension, followed by the addition of triethylamine. Only a small color change occurred initially, but after a few minutes, the color darkened and the solid dissolved. Heating was then begun and the reaction allowed to reflux for 30 minutes. The suspension was chilled and the solid collected and washed with Methyl Cellosolve. The crude dye was purified by refluxing with Methyl Cellosolve to remove dye impurities.

The resultant cyanine dye had a molar extinction coefficient in methanol of 90,000 at a $\lambda_{max}$ of 520 nm and may be represented by the formula:

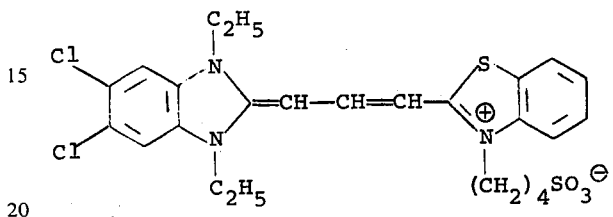

anhydro-5,6-dichloro-3-ethyl-3'-(4''-sulfobutyl)benzimidazolothiacarbocyanine hydroxide.

Since certain changes may be made in the above process without departing from the scope of the invention herein involved, it is intended that all matter contained in the above description be interpreted as illustrative and not in a limiting sense.

What is claimed is:
1. A method which comprises:
condensing a benzimidazolium salt of the formula:

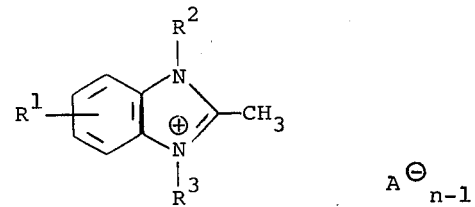

with an alkyl isoformanilide in a glycol ether medium to form a 2-$\beta$-anilinovinyl derivative represented by the formula:

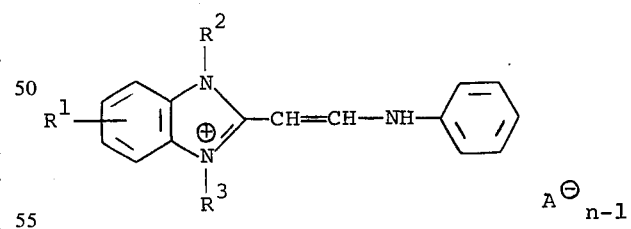

wherein $R^1$ represents hydrogen or one or more cyanine dye nuclear substituents; $R^2$ is lower alkyl; $R^3$ is lower alkyl, carboxyalkyl or sulfoalkyl; A is an anion customary in the cyanine dye art; and $n$ is 1 or 2.

2. A method as defined in claim 1 wherein said alkyl isoformanilide is ethyl isoformanilide.

3. A method as defined in claim 1 wherein said glycol ether is 2-methoxyethanol.

4. A method as defined in claim 1 wherein said nuclear substituent of $R^1$ is lower alkyl, lower alkoxy, benzyl, phenyl, naphthyl, halogen, amino, hydroxyl, cyano, lower carboxyalkyl, lower carbalkoxy or lower acylamido.

5. A method as defined in claim 1 wherein said anion of A is chloride, bromide, iodide, methylsulfate, ethylsulfate, p-toluenesulfonate, benzenesulfonate, acetate, propionate, cyanate, or perchlorate.

6. A method comprising the steps of:
 1. condensing a benzimidazolium salt of the formula:

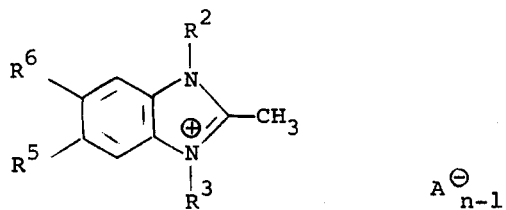

with ethyl isoformanilide in a 2-methoxyethanol medium to form a 2-$\beta$-anilinovinyl compound of the formula:

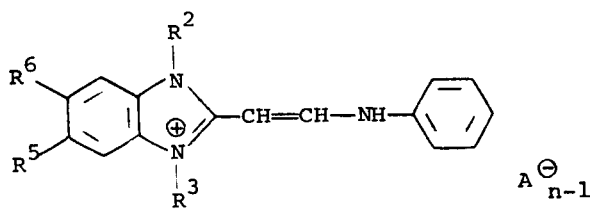

2. reacting said 2-$\beta$-anilinovinyl compound with a strong base to form the corresponding phenylimino compound of the formula:

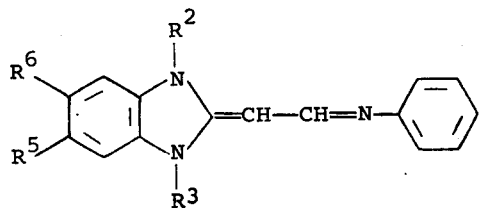

3. reacting said phenylimino compound with p-toluenesulfonyl chloride to form the corresponding p-tolusulfoanilidovinyl compound of the formula:

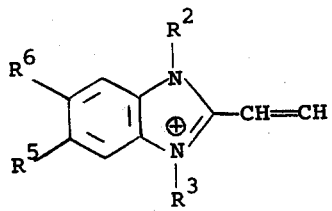

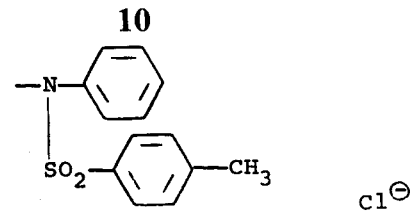

4. condensing with said p-tolusulfoanilidovinyl compound in a 2-methoxyethanol medium in the presence of a basic condensing agent, a heterocyclic quaternary salt of the formula:

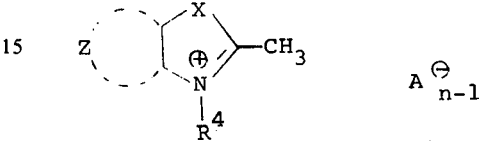

and
5. collecting from the reaction medium an unsymmetrical cyanine dye of the formula:

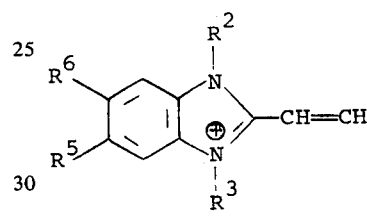

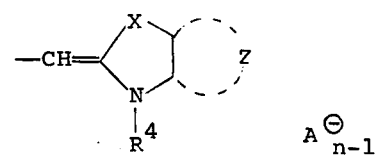

wherein $R^2$ is lower alkyl; $R^3$ and $R^4$ are the same or different and each represent a lower alkyl, carboxyalkyl, or sulfoalkyl group; $R^5$ is halogen, cyano or lower carboxyalkyl; $R^6$ is hydrogen or halogen; X is S or Se; Z represents the atoms necessary to complete a heterocyclic nucleus of the benzothiazole or benzoselenazole series; A is an anion customary in the cyanine dye art and $n$ is 1 or 2.

7. A method as defined in claim 6 wherein Z includes in the 5-position a halogen, lower alkyl, lower carbalkoxy, lower alkoxy, or lower acylamido substituent.

8. A method as defined in claim 6 wherein $R^2$ and $R^3$ are each ethyl; $R^4$ is 4-sulfobutyl; $R^5$ and $R^6$ are each chloro; X is S; Z represents the atoms necessary to complete an unsubstituted benzothiazole nucleus; and $n$ is 1; and said basic condensing agent is triethylamine.

9. A method as defined in claim 6 wherein steps (3) and (4) are conducted in the same 2-methoxyethanol medium.

* * * * *